1,786,566

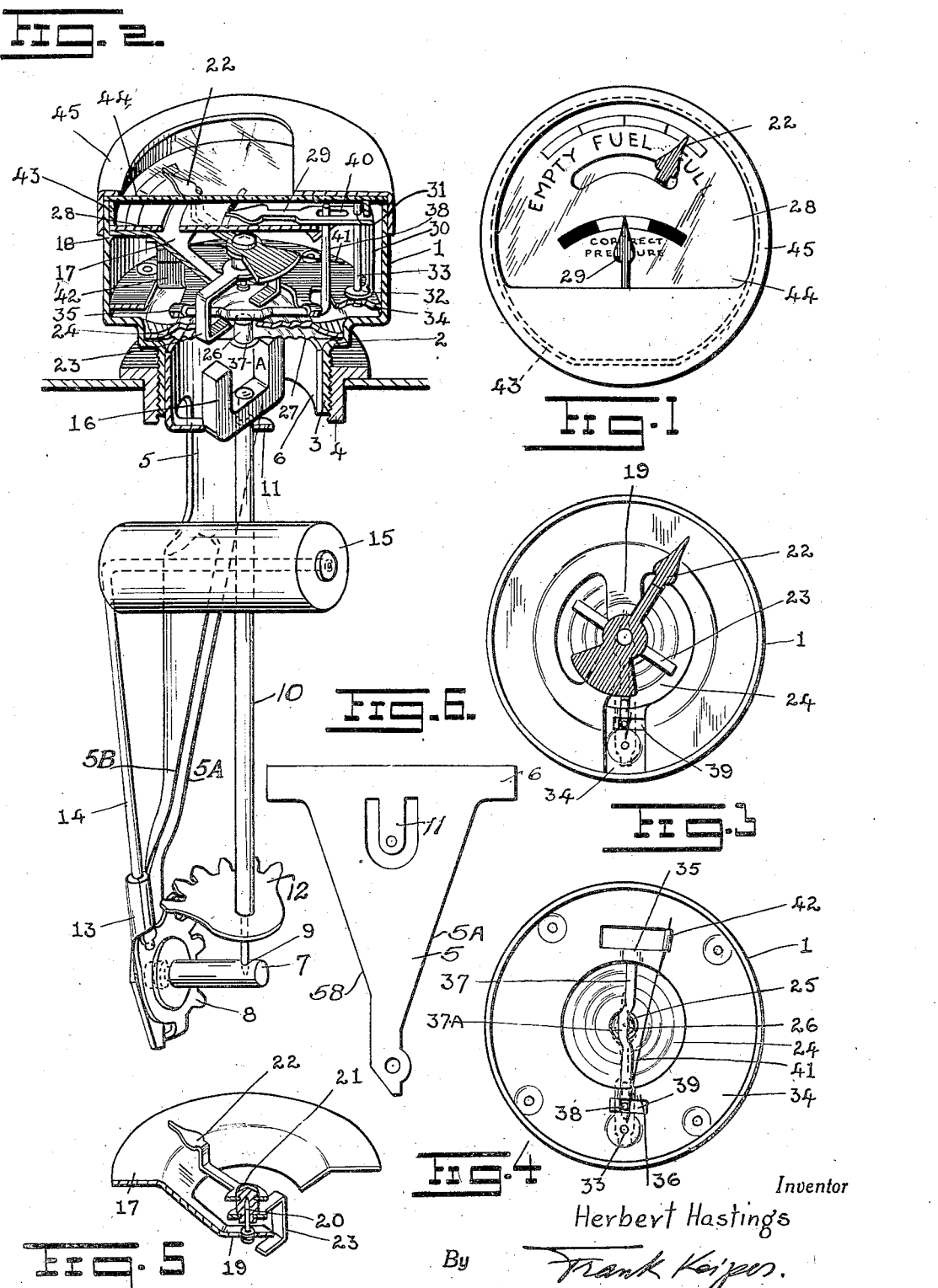
Dec. 30, 1930. H. HASTINGS 1,786,566
COMBINED LIQUID LEVEL AND PRESSURE GAUGE
Filed July 25, 1927
Inventor
Herbert Hastings
By Frank Keijser.
Attorney Patented Dec. 30, 1930

UNITED STATES PATENT OFFICE

HERBERT HASTINGS, OF BRIGHTON, NEW YORK

COMBINED LIQUID LEVEL AND PRESSURE GAUGE

Application filed July 25, 1927. Serial No. 208,098.

This invention relates to both pressure and liquid level gauges and has for its object to provide a novel construction for both the pressure gauge mechanism and the liquid level gauge mechanism so that a simultaneous indication of both the liquid level and pressure is given on a single dial requiring but one opening for mounting on a tank.

This and other objects of this invention will be fully illustrated in the drawing, described in the specification and set forth in the claims at the end thereof.

In the accompanying drawing:

Figure 1 is a top plan view of the combined pressure and liquid level gauge.

Figure 2 is a partial perspective view and vertical section of the combined pressure and liquid level gauge.

Figure 3 is a top plan view of the liquid level gauge with the dial and pressure indicator removed therefrom.

Figure 4 is a top plan view of the casing, movement plate and lever for the pressure unit of the combined gauge.

Figure 5 is a detail perspective and sectional view of the liquid level indicator unit and its mounting plate.

Figure 6 is a plan view of the blank from which the split sleeve support of the float mechanism is formed.

In the several figures of the drawing like reference numerals indicate like parts.

The combination gauge forming the subject matter of my present invention combines the mechanism of a liquid level gauge with the mechanism of a pressure gauge in such a manner that the indication of both of the gauge mechanisms are made on a single dial and can be simultaneously observed thereon. This result is secured not only by having the mechanism of both the pressure and level indicator operate without interfering with each other, but also by making it possible to operate the mechanism of both the liquid level and pressure indicator through a single opening in the tank that is not larger than the opening that is needed for an independent pressure gauge or liquid level gauge.

As illustrated in Figure 2, the mechanism of the combined gauge is mounted in a cylindrical housing or head 1 having a circular seat depressed into the bottom thereof concentric to the housing and having a threaded downwardly projecting cylindrical extension 3 of reduced diameter extending below the seat 2. The short sleeve formed by the extension sleeve 3 is threaded on the outside and is adapted to be threaded into a suitable fitting 4 provided in the opening of the tank on which the combination gauge is to be mounted. Depending from the extension or mounting sleeve 3 is the vertical supporting arm 5 which is provided with a split sleeve 6 at the top that is telescoped in the extension sleeve 3 and is suitably held in place therein. This supporting arm is made from a blank of sheet metal cut to the outline shown in Figure 6. The upper end of the blank is bent to form a split sleeve and the lug or tongue 11 is then bent up, or inturned to form a central bearing for the shaft 10. This support is shown partly in section in Figure 2 of the drawing. The opposite edges of the tapering part of the support are indicated in Figure 2 at 5A and 5B, and the corresponding parts are indicated in Figure 6. At the bottom of the vertical supporting arm 5 is provided a horizontal pivot stud 7 on which the segmental pinion 8 is mounted to oscillate. Near the outer end the pivot stud 7 is provided with a vertical thrust bearing 9 in which the reduced lower end of the vertical shaft 10 is mounted to oscillate. The upper end of this vertical shaft passes through a bearing formed in a horizontal lug 11 that is struck up below the split sleeve 6 and holds the shaft 10 in its vertical position so that it can freely oscillate between the bearing in the lug 11 and the bearing in the pivot pin 7. Meshing with the segmental pinion 8 is a segmental pinion 12 which is carried by the vertical shaft 10 and oscillates therewith.

This support including the shaft 10, float 15, magnet 16 etc. is assembled independently of the head and then the split sleeve 6 of the support is pushed into the sleeve 3 of the head far enough to bring the magnet close to the diaphragm 27 with enough clearance between them so that the magnet will turn freely under the diaphragm as the float 15 rises and falls. When in position the sleeve 6 will not make contact with the diaphragm 27.

The segmental pinion 8 has a short arm 13 projecting from it and to this arm is fastened the float arm 14 which carries at the outer end the float member 15. On the rise and fall of the liquid level within the tank the float member swings the float arm which in turn oscillates the vertical shaft 10 through the pinions 8 and 12. A U shaped permanent magnet 16 is carried at the upper end of the vertical shaft 10 and oscillates with the shaft and by reason of its magnetic force operates the liquid level indicating mechanism that will now be described.

The liquid level indicating mechanism, operated by the float operated magnet 16, is mounted within the casing 1 and comprises the auxiliary movement plate 17 which is supported at a suitable elevation within the casing 1 by means of lugs 18 that are struck up into the wall of the casing for the periphery of the auxiliary movement plate to rest thereon. The center of the auxiliary movement plate is counter sunk and is partially cut away leaving but a narrow supporting bar 19 extending from one side across the open center of the counter sunk portion of the auxiliary movement plate. On this supporting bar 19 is mounted the pivot pin 20 which serves as the bearing for the indicating pointer unit. This unit comprises a hub 21 in which the bearing for the unit is formed and to this hub are suitably fastened the pointer or hand 22 and the armature 23. Both the pointer or hand and the armature are fixed on the hub with relation to each other and are so designed that their weight is balanced on the hub so as to provide a free swinging movement for the pointer unit on the pivot pin 20.

The armature 23 comprises a narrow and thin strip of sheet iron that is bent into a rectangularly shaped frame in which the free ends oppose each other with an air gap of suitable length provided between them. The armature thus formed is centrally supported at the bottom of the hub 21 and each side of the armature projects through the cut out center of the auxiliary movement plate 17 on either side of the supporting bar 19 thereof. In this way the opposing poles of the armature are suspended within close proximity of the upper face of the stop plate 24. This stop plate is mounted in the depressed seat of the cylindrical housing 1 and through the hole 25 provided in the center thereof projects the pressure button 26. This button is carried by the pressure responsive diaphragm 27 and is mounted centrally thereof. The pressure responsive diaphragm is also mounted on the circular seat 2 in the bottom of the casing 1 and seals the inside of the tank from the inside of the cylindrical casing and responds to any pressure that is developed in the tank for the operation of the pressure indicating mechanism. The stop plate 24 located above the pressure responsive diaphragm is suitably spaced from it and limits the movement of the pressure responsive diaphragm so that excessive pressure cannot injure the pressure responsive diaphragm.

Both the stop plate 24 and the pressure responsive diaphragm 27 are made of non-magnetic material so that the magnetic lines of force from the U shaped permanent magnet 16 that is carried on top of the vertical shaft 10 are not deflected by them, but penetrate through them and attract the pole ends of the armature 23 of the liquid level pointer unit. The poles of the permanent magnet 16 thus operate to magnetically hold the armature of the pointer unit at all times parallel to it so that on the oscillation of the permanent magnet on the rise and fall of the liquid level within the tank, the armature of the pointer unit and with it the pointer are oscillated and indicate on the dial 28 the relative liquid level in the tank.

The pressure within the tank is indicated on the same dial 28 by the pointer 29 forming part of the pointer unit 30. This pointer unit comprises a vertical member on the upper end of which is formed the pointer 29. A bearing 31 is provided near the inner end of the pointer 29 and on the lower end of the vertical member of the pointer unit in a short horizontal projection is provided the bearing 32. Both the bearings 31 and 32 are in line with each other and the pivot pin 33 on which the pointer unit is mounted to swing passes through both of these bearings. The pivot stud 33 is anchored in the movement plate 34 that is supported above the stop plate 24 and suitably spaced from it. The center of the movement plate 34 is cut out and on the periphery of the cut out portion at two diametrically opposite points are struck up from the bottom the semi-circular bearings 35 and 36. The crank pin 37 is mounted in these bearings and spans the cut out portion of the movement plate 34 so as to have its offset middle or crank portion 37A rest on top of the pressure button 26 of the pressure responsive diaphragm 27. The pressure button thus holds the crank pin 37 in place in the bearings 35 and 36 and rocks this pin as it rises and falls on the increase or decrease of the pressure within the tank.

An extension 38 is provided at one end of the crank pin 37 and projects upwardly therefrom through the opening 39 in the movement plate into the elongated slot 40 provided in the pointer 29. When therefore, the crank pin 37 is rocked by the pressure button 26 the extension 38 thereof swings the pointer 29 to indicate the pressure, applied to the pressure diaphragm 27, on the dial 28.

The movement of the pressure button on the increase in pressure swings the pointer unit 30 in but one direction against the pressure of the spring finger 41 which is anchored in the lug 42 that is struck up from the movement plate 34. The free end of the spring finger 41 makes contact with the upwardly extending extension 38 of the crank pin 37, and the resistance which it offers to the movement of the pointer unit is adjusted so that the movement caused by the pressure responsive diaphragm through the pressure button gives the correct pressure indication on the dial 28. The spring finger 41 also serves to keep the offset crank portion of the crank pin constantly in contact with the pressure button when the pressure on the diaphragm decreases so that the increase as well as the decrease in pressure is constantly indicated by the hand or pointer 29.

The dial 28 is held in place on top of the auxiliary base plate 17 by the spacing ring 43 and the transparent cover 44 is held in place on top of the spacing ring and the upper edge of the casing 1 by means of the flanged cover plate 45 that is suitably cut out so that the indication of the pointers or hands 22 and 29 can be simultaneously observed on the dial 28.

The pressure calibration on the dial of the combined liquid level and pressure gauge has three zones. The center zone is white and indicates limits of the safe pressure. The end zones on either side of the white zone are red and indicate the unsafe pressures which in one case is too low a pressure and in the other case a too high a pressure.

I claim:

1. In a combined liquid level and pressure indicator adapted to be mounted in a pressure sustaining chamber, the combination of a dial chamber, a liquid level indicator and a pressure indicator in said dial chamber, there being an impervious pressure responsive wall separating said dial chamber from said pressure sustaining chamber, said impervious pressure responsive wall operating said pressure indicator on the rise and fall in pressure in said pressure sustaining chamber, a liquid level responsive member mounted in said pressure sustaining chamber and means operated by said liquid responsive member for operating said liquid level indicator magnetically through the pressure responsive wall on the movement of said liquid level responsive member.

2. In a combined liquid level and pressure indicator adapted to be mounted on a tank and forming a pressure sustaining chamber therewith, and a dial chamber, there being an impervious wall between said chambers having a portion thereof that is pressure responsive with sufficient movement for operating the pressure indicator, a liquid level indicator and a pressure indicator in said dial chamber, means by which said pressure responsive portion of said wall transmits motion to said pressure indicator and magnetic means transmitting motion through said impervious pressure responsive wall to said liquid level indicator.

3. A combined liquid level and pressure gauge comprising a housing, a float mechanism and a pressure responsive member supported thereby, a dial in the top of said housing provided with a pair of arcuate scales thereon, a magnetic pointer mounted to oscillate concentrically with one of said scales and a non-magnetic pointer mounted to oscillate concentrically with the other of said scales, means whereby the pressure responsive member operates one of said pointers, and a float mechanism including a magnet operating said magnetic pointer through the pressure responsive member.

4. A combined liquid level and pressure gauge comprising a housing, a dial in said housing provided with a liquid level calibration and a pressure calibration, a magnetically controllable liquid level indicator indicating on said liquid level calibration and a pressure indicator indicating on said pressure calibration to permit the simultaneous reading of both the liquid level and pressure on the single dial, an impervious wall below said dial and indicators and having a pressure responsive portion therein for operating the pressure indicator, and a float mechanism including a magnet for operating said magnetically controllable indicator, through said wall.

5. A combined liquid level and pressure gauge comprising a housing, an impervious wall having a pressure responsive portion therein closing and sealing said housing, a pointer in said housing, on one side of said wall, means operating said pointer from said pressure responsive portion, a magnet mounted to operate adjacent to the other side of said wall, a liquid level responsive means including a float mechanism for oscillating said magnet, from the last mentioned side of said wall, a magnetically controllable pointer unit on the first mentioned side of said wall, and operated by said magnet, said magnet and float mechanism being on the same side of said wall whereby said pointer unit is held in a position corresponding to the position of said magnet.

6. A combined liquid level and pressure gauge comprising a housing having an opening therein, a dial in the top of said housing, pointers operating over said dial, a liquid level responsive mechanism, including a magnet, an impervious wall having a pressure responsive portion therein in the bottom of said housing, means operated upon by said pressure responsive portion and adapted to move a pointer on said dial, said wall forming an impervious partition in said opening of said housing and means operated magnetically by the magnet of said liquid level responsive mechanism to operate another pointer on said dial, said magnet exerting its force on and operating said means through the wall.

7. A combined liquid level and pressure gauge comprising a head, a liquid level responsive mechanism including a magnet, an impervious wall having a pressure responsive portion therein forming a part of the head, a pointer, connections whereby said pointer is operated by said pressure responsive portion, said magnet transmitting the movement of said liquid level responsive mechanism through said wall and a pointer actuated by said magnet.

8. A combined liquid level and pressure gauge comprising a housing, a single dial mounted in said housing, a magnetically operated liquid level indicating pointer, and a pressure indicating pointer traversing said dial, an impervious wall having a pressure responsive portion thereon for operating said pressure indicator pointer, suitable means by which the pressure responsive member operates the pointer, and a liquid level responsive mechanism including a magnet for operating said liquid level indicating pointer, said magnet operating said pointer through said wall.

9. A combined liquid level and pressure gauge comprising a head divided into two parts separated by a wall, one portion of which wall is impervious and rigid and another portion of which wall is impervious and flexibly responsive to changes in pressure on one side of the wall, a pressure indicating unit and means for transmitting the motion of said pressure responsive portion of said wall to said pressure indicating unit, a magnetically controllable liquid level pointer and a liquid level responsive means including a magnet adapted to control said liquid level pointer through said impervious wall.

10. A combined liquid level and pressure gauge comprising a head, a magnetic liquid level pointer unit, and a pressure indicating pointer unit both of which are mounted on said head, a pressure responsive member forming a portion in said head and a liquid level responsive mechanism including a magnet adapted to control said liquid level pointer unit, and means for transmitting the motion of said pressure responsive member to said pressure indicating unit, a single dial having two arcuate scales thereon and adapted to have both of said indicating pointer units indicate simultaneously on the dial the pressure on and level of the liquid in the tank.

11. A combined liquid level and pressure gauge adapted to be mounted on a tank, comprising a housing, a pressure indicator, a magnetically controllable liquid level indicator, a pressure responsive member forming an impervious wall in said housing and adapted to operate said pressure indicator, and separating the inside of the housing from the inside of the tank, a liquid level responsive mechanism including a magnet on the outside of said pressure responsive member, the magnet of said liquid level responsive mechanism being adapted to operate said liquid level indicator through the impervious wall of said pressure responsive member.

12. A combined liquid level and pressure gauge comprising a housing, a dial in the top of said housing, a pressure responsive impervious diaphragm forming a portion of the bottom wall of said housing, a magnet mounted to oscillate in close proximity to said diaphragm, a crank shaft mounted to oscillate above said diaphragm and means for oscillating said crank shaft on the movement of said diaphragm, a pointer unit operated by said crank shaft, a second pointer unit carrying an armature mounted to freely oscillate above said crank shaft and adapted to be attracted through said pressure responsive diaphragm by the magnetic lines of force of said magnet to hold said second pointer unit in a position corresponding to the position of said magnet.

13. A combined liquid level and pressure gauge comprising a housing, a dial in said housing, an auxiliary movement plate below said dial, a pivot pin, a pointer unit pivoted on said pivot pin centrally of said auxiliary movement plate and projecting through said dial, said auxiliary movement plate having an opening partially encircling said pointer unit, an armature carried by said pointer unit, downwardly projecting pole members formed on said armature, and projecting through the opening in said auxiliary movement plate at two diametrically opposite points of said pointer unit, an impervious partition in the bottom of said housing and a magnet mounted to oscillate on the outside of said impervious partition, a liquid level responsive mechanism for operating said magnet, said magnet magnetically attracting said armature through said impervious partition and holding said pointer unit in a position corresponding to the position of said magnet.

14. A combined liquid level and pressure gauge comprising a housing, a dial in the top of said housing provided with an opening, an auxiliary movement plate below said dial having its center counter sunk and partially cut away, a pivot pin supported centrally of said auxiliary movement plate, a pointer unit pivoted on said pivot pin, a pointer provided on said pointer unit and projecting through the opening in said dial, a movement plate below said auxiliary movement plate, a crank shaft mounted to oscillate on said movement plate, a second pivot pin mounted on said movement plate, a second pointer unit mounted on said second pivot pin, and means for swinging said second pointer unit on the oscillation of said crank shaft, a pressure responsive diaphragm below said movement plate adapted to oscillate said crank shaft on the movement of the diaphragm, an armature carried by said first named pointer unit and projecting in close proximity to said pressure responsive diaphragm and a magnet mounted to oscillate below said pressure responsive diaphragm, a liquid level responsive member for oscillating said magnet, the magnetic lines of force of said magnet being adapted to hold said armature and its pointer unit in a position corresponding to the position of said magnet.

15. The combination of a case adapted to form part of a pressure chamber when combined with a tank, and a dial chamber with an impervious wall between the same and the part of the said pressure chamber, said wall having a pressure responsive portion therein, a float gauge mechanism including a magnet arranged on the pressure chamber side of said wall, a dial provided with two sets of indications and mounted in said dial chamber, a pressure indicating pointer adapted to traverse one set of said indications and means whereby it is adapted to be actuated by said pressure responsive portion, and a liquid level indicating pointer adapted to traverse the other set of said indications and adapted to be actuated by said magnet.

16. The combination of a case adapted to form part of a pressure chamber when combined with a tank, and a dial chamber with an impervious wall between the same and the part of the said pressure chamber, said wall having a pressure responsive portion therein, a float gauge mechanism including a magnet arranged on the pressure chamber side of said wall, a dial provided with two sets of indications and mounted in said dial chamber, a pressure indicating pointer adapted to traverse one set of said indications and means whereby it is adapted to be actuated by said pressure responsive portion, and a liquid level indicating pointer adapted to traverse the other set of said indications and provided with an armature portion arranged in a different plane from said level indicating pointer and adapted to be actuated by said magnet.

17. The combination of a pressure indicating unit and a liquid level indicating unit, a head adapted to support the two units, a liquid level responsive member, a magnet operated by said liquid level responsive member, a wall in said head having a pressure responsive portion, said magnet operating said liquid level pointer unit by its magnetic field through said wall, and means for operating said pressure indicating unit on the movement of said pressure responsive portion without disturbing said magnetic field.

18. In a combined liquid level and pressure indicator, a case including an impervious wall having a pressure responsive portion, a dial and pointers and movement mechanism therefor supported by said case, said pointers being pivoted eccentrically to each other, said case being provided with a hollow cylindrical portion threaded externally, a support having a split sleeve adapted to be mounted within said cylindrical portion, a float mechanism mounted on said support, magnetic means by which the float mechanism drives through said wall one of said pointers and means by which the pressure responsive portion of said wall drives the other pointer.

19. In an indicator, a head adapted to support an indicating mechanism, said head having a hollow cylindrical portion threaded externally, a float mechanism having a swinging arm with a float thereon, a support for said float mechanism, said support being shaped from sheet metal to form a split tubular portion adapted to engage internally within said hollow cylindrical portion of the head to support the float mechanism, a shaft mounted in said support to turn therein, a lug struck up from said support intermediate the ends thereof to form a bearing for the upper portion of said shaft.

20. In an indicator, a head provided with a hollow cylindrical portion, said head being adapted to support an indicating mechanism and a float mechanism, a float mechanism including a support having a tubular end with an integral in-turned central bearing near one end thereof and a second bearing provided in the other end thereof, a gear mounted on said second bearing, said support being adapted to engage the inside of said hollow cylindrical portion of said head to support the remainder of said float mechanism.

21. In an indicator, a head provided with a hollow cylindrical portion, said head being adapted to support an indicating mechanism, a float mechanism, having a swinging arm with a float thereon, said float mechanism including a support having a tubular end with an integral in-turned central bearing intermediate the ends and near one end of said support, and a second bearing provided in the other end of said support, said support being adapted to engage the inside of said hollow cylindrical portion of said head to support the remainder of said float mechanism.

22. In a combined liquid level and pressure indicator, a case drawn from sheet metal a portion of which forms a dial and movement chamber and another portion of which is adapted with the tank to form a pressure chamber, a dial seat embossed in said dial chamber, screw threads provided on the outside of a portion of said case, a float gauge mechanism depending from said last named portion, a wall between said portions, a portion of said wall being adapted to form pressure responsive means and a pointer and connections adapted to operate said pointer from said pressure responsive means.

23. In a liquid level and pressure indicator, a case drawn from sheet metal a portion of which forms a dial and movement chamber and another portion of which is adapted with the tank to form a pressure chamber, screw threads provided on the outside of a portion of said case, a float gauge mechanism suspended from said last named portion, a wall between said portions, a portion of said wall being adapted to form pressure responsive means, a pointer in the dial and movement chamber and adapted to be operated by said pressure responsive means, and means whereby said pointer is so operated.

24. A combined liquid level and pressure indicator comprising a casing drawn from sheet metal, said casing being divided into a dial and movement chamber and a pressure dome, pressure responsive means sealing a portion of the wall separating said dome and chamber, a magnet mounted to oscillate on one side of said wall, and an armature mounted on the other side of said wall and adapted to be oscillated by the magnetic lines of force of said magnet, said pressure responsive means being provided with suitable mechanism and adapted to operate said pressure indicator.

25. A combined liquid level and pressure indicator comprising a casing drawn from sheet metal, said casing being divided into a dial and movement chamber and a pressure dome, pressure responsive means sealing a portion of the wall of said dome, a magnet mounted to oscillate in said pressure dome adjacent to said pressure responsive means, and an armature mounted to oscillate in said movement chamber and operated from within said pressure dome by the magnetic lines of force of said magnet through the pressure responsive means.

26. In a combined liquid level and pressure indicator, a head, a portion of which is adapted to form an indicator housing and another portion of which is adapted to form a part of a pressure housing when mounted on a pressure tank, a wall having a pressure responsive member therein, said wall separating said two portions, a supporting arm mounted in said second portion, a supporting bearing at one end of said supporting arm and a guide bearing at the other end of said supporting arm, a shaft mounted to rotate between said supporting bearing and said guide bearing, a magnet carried by said shaft, a float mechanism for operating said shaft and magnet, a pointer and means by which it is adapted to be actuated by said pressure responsive member and a second pointer adapted to be actuated by the force of said magnet.

27. A combined liquid level and pressure gauge adapted to be used in a tank having an opening therein, a head forming part of said gauge and adapted to close and seal said opening, said head being subjected to high pressure from within the tank, said head having a portion thereof adapted to distort as the pressure in the tank changes, means connected to said predetermined portion of the head by which changes in the pressure in the tank are measured, a magnet forming part of the liquid level gauge structure and located on the high pressure side of the head, means to cause movement of said magnet by variations in the level of the liquid in the tank, the magnetic force of said magnet passing through said head, an armature on the low pressure side of said head adapted to be moved by the magnetic force of said magnet to indicate the depth of the liquid in the tank.

28. A combined liquid level and pressure gauge adapted to be used in a tank having an opening therein, a head forming part of said gauge and adapted to close and seal said opening, said head being subjected to high pressure from within the tank, said head having a portion thereof adapted to distort as the pressure in the tank changes, means connected to said predetermined portion of the head by which the changes in the pressure in the tank are measured, a magnet forming part of the liquid level gauge structure and located on the high pressure side of the head, a float adapted to move the magnet on the rise and fall of the liquid in the tank, an armature located on the low pressure side of said head and moved by the magnetic force of said magnet to indicate the depth of the liquid in the tank, said head and magnet and float and armature being all combined in a single unitary structure having a male thread thereon adapted to engage with a female thread in the opening in the tank to cause the gauge to seal the opening in the tank.

29. A combined pressure and liquid level gauge comprising a housing, a dial in said housing, two pointers adapted to cooperate with said dial, said housing having a depending sleeve, a head in said sleeve adapted to directly close a tank and hold the air therein under pressure, an arm extending down from said sleeve into the tank, a float supported thereby, a shaft mounted on said arm and operated by said float, a magnet on said arm, said head being above said magnet, an armature above the head operated by said magnet through the head, said armature operating one of said pointers, said pointer being pivoted centrally of the gauge, part of said head being rigid and the remaining part being pressure responsive, the second pointer on the gauge being pivoted eccentrically thereon and being operated by the pressure responsive part of the head.

30. In an indicator, a head provided with a hollow cylindrical portion, said head being adapted to support an indicating mechanism, a float mechanism having a swinging arm with a float thereon, said float mechanism including a support made of sheet metal and having a tubular end made integral therewith with an integral inturned tongue having a central bearing therein which tongue is intermediate the ends of the support and near one end thereof, and a second bearing provided in the other end of said support, said support being adapted to engage the inside of said hollow cylindrical portion of said head to support the remainder of said float mechanism.

31. In an indicator, a head provided with a hollow cylindrical portion, said head being adapted to support an indicating mechanism, a float mechanism having a swinging arm with a float thereon, said float mechanism including a support made of sheet metal and having a tubular end made integral therewith with an integral inturned tongue having a central bearing therein which tongue is intermediate the ends of the support and near one end thereof, and a second bearing provided in the other end of said support, said support being adapted to engage the inside of said hollow cylindrical portion of said head to support the remainder of said float mechanism, an upright shaft mounted to rotate in said bearings, and a magnet carried on the upper end of said shaft and above the inturned tongue.

32. A float mechanism for an indicator having a swinging arm with a float thereon, a support for said mechanism made of sheet metal and having a tubular end made integral therewith, an integral inturned tongue on said support having a bearing therein, which tongue is intermediate the ends of the support and near one end thereof, and a second bearing provided at the other end of said support, an upright shaft mounted to rotate in said bearings, and a magnet carried on the upper end of said shaft above the inturned tongue.

In testimony whereof I affix my signature.

HERBERT HASTINGS.